United States Patent [19]
Ono

[11] Patent Number: 5,980,178
[45] Date of Patent: Nov. 9, 1999

[54] ORNAMENTAL BOLT AND NUT

[75] Inventor: Toru Ono, Izumi, Japan

[73] Assignee: Yugen Kaisha Ion Seiko, Osaka-fu, Japan

[21] Appl. No.: 09/025,736

[22] Filed: Feb. 18, 1998

[30] Foreign Application Priority Data

Feb. 27, 1997 [JP] Japan .................................. 9-043555

[51] Int. Cl.$^6$ .............................. F16B 19/00; F16B 33/00
[52] U.S. Cl. ......................... 411/373; 411/377; 411/430; 411/903
[58] Field of Search ................................ 411/13, 14, 372, 411/373, 377, 429, 430, 431, 903, 910

[56] References Cited

U.S. PATENT DOCUMENTS

| 313,772 | 3/1885 | Rothlisberger | 411/430 |
|---|---|---|---|
| 379,214 | 3/1888 | Firth | 411/429 |
| 2,823,479 | 2/1958 | Zdanowski | 411/377 X |
| 3,971,289 | 7/1976 | Chaivre | 411/430 |
| 5,088,867 | 2/1992 | Mun | 411/14 X |

FOREIGN PATENT DOCUMENTS

| 24935 | 3/1981 | European Pat. Off. | 411/431 |
|---|---|---|---|
| 496384 | 12/1975 | U.S.S.R. | 411/13 |

*Primary Examiner*—Neill Wilson
*Attorney, Agent, or Firm*—Nikaido Marmelstein Murray & Oram, LLP.

[57] ABSTRACT

The invention is aimed at to provide ornamental nuts and bolts of a solid and high-quality characteristic, which are prevented from breakage and dislodgement due to a shock, which are easily manufactured and assembled, which are easily modified in their design, and which are produced at low cost.

An ornamental seal 2 is inserted into a recess 1*b* formed at the rearward portion of a nut body 1*c* or into a recess 5*b* formed in a head 5*a* of a bolt body 5*c*, and secured therein. The upper surface of the ornamental seal 2 is protectively covered with a film layer of a transparent or translucent material.

8 Claims, 3 Drawing Sheets

രണ്ട്5,980,178

ORNAMENTAL BOLT AND NUT

FIELD OF THE INVENTION

The present invention relates to an ornamental nut and bolt to be used, for example, for attaching wheels to an axle of an automobile.

BACKGROUND OF THE INVENTION

The above kind of nut is known in prior art, for example, from Japanese Utility Model Publication No. 43-4602, Japanese Utility Model Publication No. 49-27159, Japanese Utility Model Public Disclosure No. 56-64801, Japanese Utility Model Public Disclosure No. 59-20020, and Japanese Utility Model Public Disclosure No. 63-42911.

The ornamental nut disclosed in Japanese Utility Model Publication No. 43-4602 includes a nut body having an annular groove in its upper portion. A spherical cap is fitted in the annular groove and secured therein. Desired characters or symbols are indicated on the inner surface of the cap by means of luminous paint, for example.

The ornamental nut disclosed in Japanese Utility Model Publication No. 49-27159 includes a head piece corresponding to the above-mentioned cap. The head piece is provided with a leg. The leg is threaded into the upper portion of the nut and secured therein.

The ornamental nut disclosed in Japanese Utility Model Public Disclosure No. 56-64801 includes a recess in the upper surface of the nut. A reflector plate of a hard material for reflecting light, such as a stainless plate or a chrome-plated steel plate, is placed on the bottom of the recess. A light-reflective body of a cap-like configuration formed from a transparent material is disposed on the reflector plate. The light-reflective body includes a hollow portion and an inner surface formed with irregularity. The light-reflective body is secured, at its periphery, in the recess in the upper surface of the nut by means of adhesive added with a fluorescent material, in order to reflect external light. Indicative ability is exerted by light from the fluorescent material.

The ornamental nut disclosed in Japanese Utility Model Public Disclosure No. 59-20020 includes a separate cap on the upper portion of the nut. The cap is crimped on the upper portion of the nut.

The ornamental nut disclosed in Japanese Utility Model Public Disclosure No. 63-42911 includes a semi-spherical cap fitted over the upper portion of the nut. The cap is formed from a transparent or translucent material. The inner surface of the cap is coated with a metal film, using a vacuum deposition technique. An engagement protrusion is formed around the fitted portion. The engagement protrusion is adapted to be securely engaged with an annular engagement groove formed in the inner peripheral surface of the upper portion of the nut.

In the nut of Japanese Utility Model Publication No. 43-4602, the cap is protruded outwardly, so that cracks, defects, breakage or dislodgement may occur easily, when subjected to a shock. In the nut of Japanese Utility Model Publication No. 49-27159, it is necessary to provide the leg on the head piece. It is also necessary for the leg to be formed with a threaded portion. Thus, manufacturing process is complicated and the production cost is increased. It is also noted that the threaded portion tends to be easily loosened and dislodged. Even when ornamental treatment is performed relative to the upper portion, scratches are easily caused. It is also noted that a solid and high-quality characteristic could not disadvantageously be given to the nut.

The nut of Japanese Utility Model Publication No. 56-64801 is of a construction in which a reflector plate of a hard material for reflecting light, such as a stainless plate or a chrome-plated steel plate, is placed on the bottom of the recess. The light-reflective body having a hollow portion is fitted over the reflector plate. The peripheries of the light-reflective body and the reflector plate are secured by means of adhesive. Thus, it is very difficult to evenly apply the adhesive, in order to prevent the adhesive from being protruding from the upper surface of the light-reflective body and the upper surface of the reflector plate. In this regard, the adhesive is preliminarily formed into an annular configuration. The thus formed ring is fitted around the reflector plate and then melt and adhered thereto by heating. This requires an extended period of time during manufacturing and assembling process. It is noted further that three parts are required, i.e., the reflector plate, the light-reflective body and the adhesive shaped into an annular configuration. This increases the cost for producing molds. Modification of design cannot be performed easily. Manufacturing process and assembling process are also complicated, thus increasing the production cost. It is also noted that the depth of the recess formed in the upper surface of the nut should be significantly increased, in order to preserve the hollow portion for the light-reflective body of a cap-like configuration. Thus, the length of the nut body is disadvantageously increased.

The nut of Japanese Utility Model Public Disclosure No. 59-20020 has a disadvantage in that the plating and coating of the nut body are damaged during crimping operation of the cap.

The nut of Japanese Utility Model Public Disclosure No. 63-42911 tends to easily cause cracks, defects and breakage when subjected to a shock, since the cap body is protruded outwardly. It is also noted that complicated and expense molds are required, since the nut includes the annular flange and the engagement protrusion. Furthermore, such nut cannot be easily manufactured.

SUMMARY OF THE INVENTION

The present invention is proposed in order to eliminate the above-mentioned disadvantages in prior art. The object of the invention is to provide ornamental nuts and bolts of a solid and high-quality characteristic, which are prevented from breakage and dislodgement due to a shock, which are easily manufactured and assembled, which are easily modified in their design, and which are produced at low cost.

In order to achieve the above object, the present invention provides an ornamental nut which comprises a nut body having a threaded hole and a recess positioned at the rear end of the threaded hole, an ornamental seal inserted in the recess and secured therein, and a film layer of a transparent or translucent material for protectively covering the upper surface of the ornamental seal.

The invention also provides an ornamental bolt which comprises a bolt body including a head having a recess in its upper surface, an ornamental seal inserted in the recess and secured therein, and a film layer of a transparent or translucent material for protectively covering the upper surface of the ornamental seal.

The film layer of a transparent or translucent material for covering the upper surface of the ornamental seal is featured by the fact that it is formed from a material which is the same as the adhesive securing the ornamental seal in the recess.

The ornamental seal is featured by the fact that it is applied, on its lower and or upper suffice, with adhesive, before the ornamental seal is inserted in the recess and secured therein.

The ornamental seal is featured by the fact that it is first inserted in the recess, and then secured in the recess by filling a quantity of adhesive in the recess. The film layer of a transparent or translucent material for covering the upper surface of the ornamental seal is featured by the fact that it is formed from a material which is the same as the adhesive filled in the recess.

BRIEF DESCRIPTION OF THE DRAWINGS

For a fuller understanding of the nature and objects of the present invention, reference should be had to the following detailed description taken in connection with the accompanying drawings wherein:

FIG. 1 shows an ornamental nut and an ornamental bolt to be used for attaching wheels to an axle of an automobile in accordance with a first embodiment of the invention, wherein

FIG. 2 shows an ornamental nut and an ornamental bolt in accord second embodiment of the invention, wherein

FIG. 3 shows an ornamental nut and an ornamental bolt in accordance with third embodiment of the invention, wherein

FIG. 4 shows an example of ornamental pattern in accordant with the invention, wherein FIG. 5 shows another ornamental nuts of the invention, wherein

DETAILED DESCRIPTION OF THE PREFERRED EMBODIMENTS

Figure 1A:
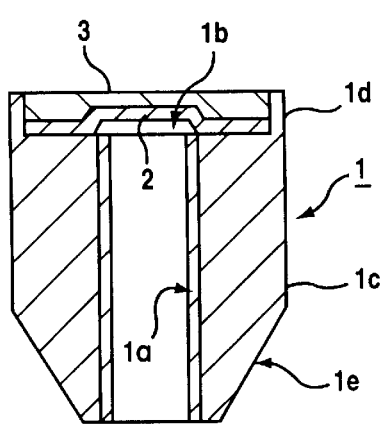
FIG. 1A is a longitudinal cross-sectional view of the ornamental nut.
Figure 1B:
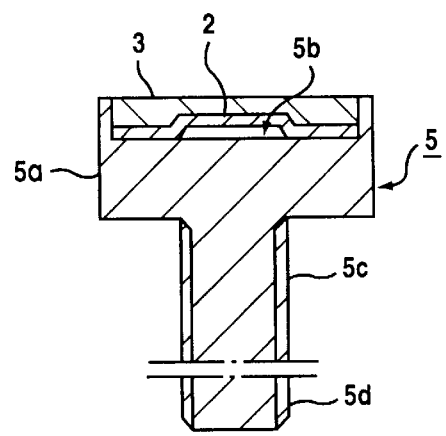
FIG. 1B is a longitudinal cross-sectional view of the ornamental bolt.
Figure 2A:
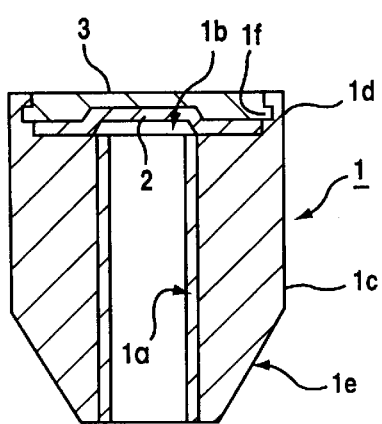
FIG. 2A is a longitudinal cross-sectional view of the ornamental nut.
Figure 2B:
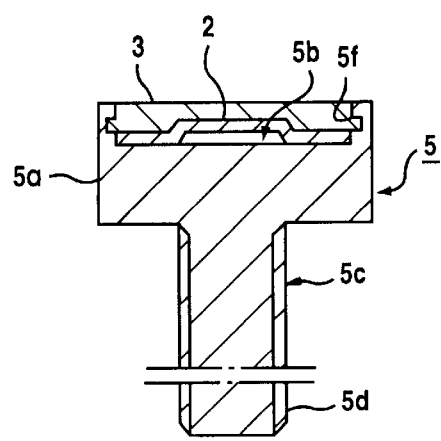
FIG. 2B is a longitudinal cross-sectional view the ornamental bolt.
Figure 3A:
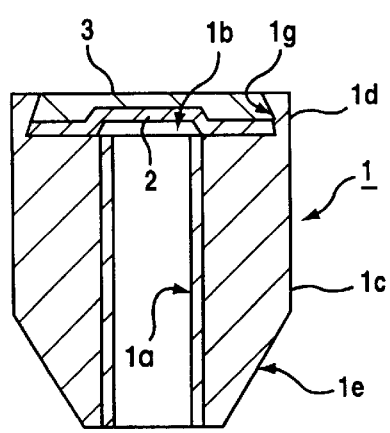
FIG. 3A is a longitudinal cross-sectional view of the ornamental nut.
Figure 3B:
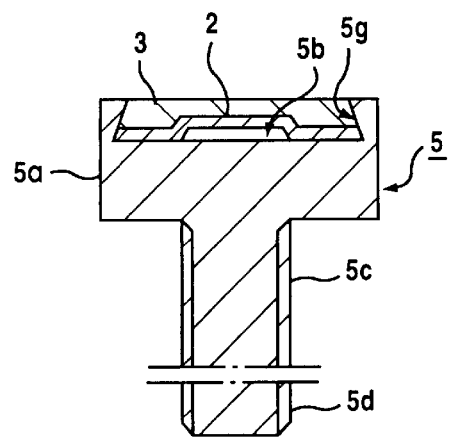
FIG. 3B is a longitudinal cross-sectional view of the ornamental bolt.
Figure 4A:
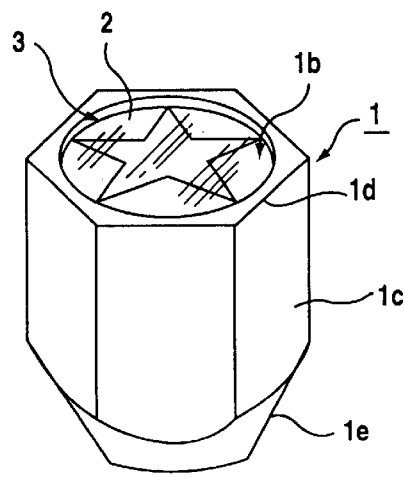
FIG. 4A is a perspective view of an ornamental nut provided with the ornamental pattern.
Figure 4B:
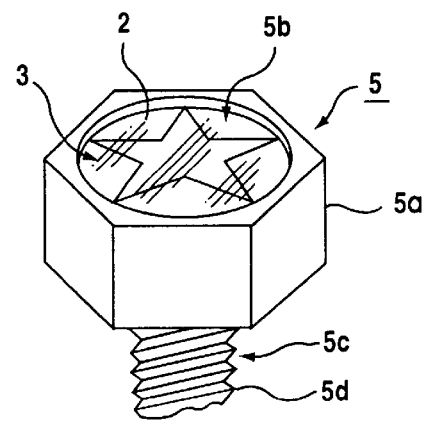
FIG. 4B is a perspective view of an ornamental bolt provided with the ornamental pattern.
Figure 5A:
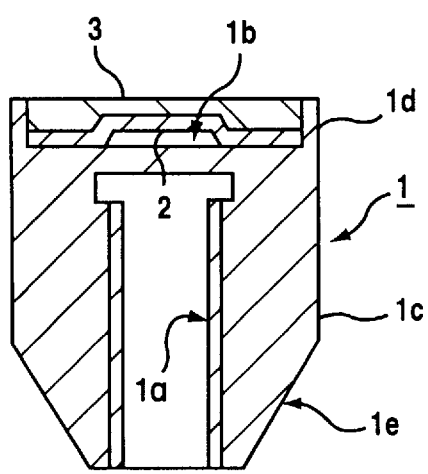
FIGS. 5A, 5B and 5C are longitudinal cross-sectional views of ornamental nuts in accordance with another embodiments of the invention.
Figure 5B:
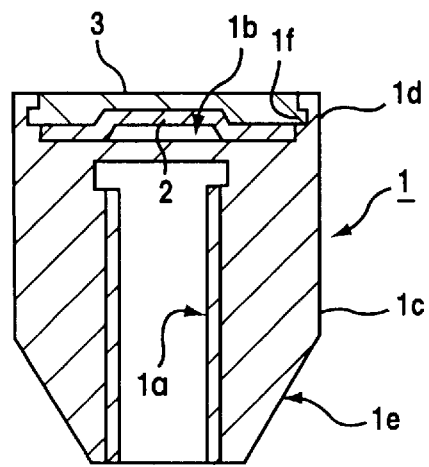
Figure 5C:
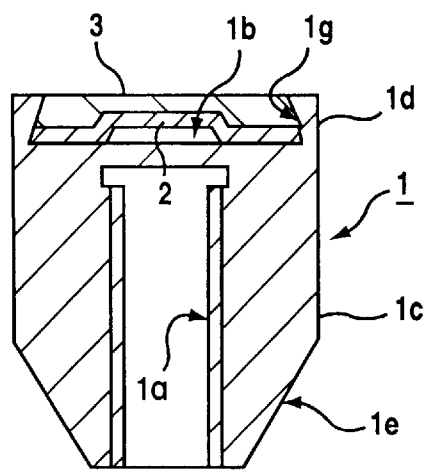

The invention will be explained in detail below with reference to several embodiments illustrated in the drawings in which FIG. 1 shows an ornamental nut and an ornamental bolt to be used for attaching wheels to an axle of an automobile in accordance with a first embodiment of the invention, wherein FIG. 1A is a longitudinal cross-sectional view of the ornamental nut, and FIG. 1B is a longitudinal cross-sectional view of the ornamental bolt; FIG. 2 shows an ornamental nut and an ornamental bolt in accordance with a second embodiment of the invention, wherein FIG. 2A is a longitudinal cross-sectional view of the ornamental nut, and FIG. 2B is a longitudinal cross-sectional view of the ornamental bolt; FIG. 3 shows an ornamental nut and an ornamental bolt in accordance with a third embodiment of the invention, wherein FIG. 3A is a longitudinal cross-sectional view of the ornamental nut, and FIG. 3B is a longitudinal cross-sectional view of the ornamental bolt; FIG. 4 shows an example of ornamental pattern in accordance with the invention, wherein FIG. 4A is a perspective view of an ornamental nut provided with the ornamental pattern, and FIG. 4B is a perspective view of an ornamental bolt provided with the ornamental pattern; and FIG. 5 shows another ornamental nuts of the invention, wherein FIG. 5A, 5B and 5C are longitudinal cross-sectional views of ornamental nuts in accordance with another embodiments of the invention.

An ornamental nut 1 of the invention includes, as shown in FIG. 1A, a nut body 1c having a threaded hole 1a and a recess 1b positioned rearward of the threaded hole 1a, an ornamental seal 2 fixedly inserted in the recess 1b, and a film layer 3 of a transparent or translucent material for protectively covering the upper surface of the ornamental seal 2.

The film layer 3 can be made from an adhesive material which is used to adhesively secure the ornamental seal 2 in the recess 1b.

The ornamental seal 2 may be secured in the recess 1b, by first applying adhesive on its lower and/or upper surface, and then inserting it in the recess 1b. In this case, a removable or strippable cover sheet may be placed on the surface(s) of the ornamental seal 2 to which adhesive has (have) been applied. Such a cover sheet is removed or stripped, before the ornamental seal 2 is inserted into the recess 1b of the ornamental nut 1, so as to cause the adhesive surface(s) to be exposed. The ornamental seal 2 is then inserted into the recess 1b and adhesively secured therein.

Alternatively, the ornamental seal 2 is first inserted into the recess 1b. Then, a quantity of adhesive is filled in the recess 1b. By this, the ornamental seal 2 may be secured in the recess 1b. Furthermore, the film layer 3 of a transparent or translucent material covering the upper surface of the ornamental seal 2 may be formed by the adhesive filled in the recess 1b.

The nut body 1c is formed in the following procedure. First, a length of material of a rod-like configuration is cut into a predetermined length. The material may be a metal which has been commonly used for conventional nuts, such as structural carbon steel. The material cut into a predetermined length is shaped, by forging, into a cylindrical body of a hexagonal cross-section. Alternatively, the cylindrical body of a hexagonal cross-section may be formed by casting the above-mentioned metal material. The thus obtained cylindrical body of a hexagonal cross-section is formed, at its central portion, with a prepared through hole by means of machining using a turning machine, for example. The cylindrical body is formed, at its rearward end, with an annular recess 1b having a diameter sufficiently greater than that of the prepared through hole. Thus, a thin peripheral wall 1d is left around the recess 1b. Then, a chamfered cosmetic portion 1e of a conical configuration is formed in the forward end portion. Thereafter, machining such as turning is performed relative to the prepared through hole, so as to form the threaded hole 1a. Depending upon a given case, a geometrical ornamental pattern may be applied to the outer peripheral surface of the nut body 1c by means of machining, for example. It is noted, however, that a simple pattern for the outer peripheral surface of the nut body is illustrated in the drawing. After completion of the above-mentioned working, the nut body 1c is transferred to a plating process and appropriately plated. Then, the ornamental seal 2 is inserted in the recess 1b and secured therein.

The ability to prevent the ornamental seal 2 and the film layer 3 from removal or separation depends on an adhesive strength of the adhesive used. It is noted, however, that such ability may be further increased using a physical anchoring force, in addition to the above-mentioned adhesive strength of the adhesive. Specifically, an anchoring groove 1f of an annular configuration may be formed in the inner peripheral surface of the recess 1b, as shown in FIG. 2A. Alternatively, the inner peripheral surface of the recess 1b may be formed into a reversed conical configuration 1g tapering toward the open end, as shown in FIG. 3A. The above embodiment illustrates a case in which the present invention is applied to the nut body 1c having a screwed through hole 1a. It is noted, however, that the invention may be equally applied to a nut body 1c having a threaded non-through hole 1a, as shown in FIGS. A, B and C.

An ornamental bolt 5 in accordance with the invention includes, as shown in FIG. 1B, a bolt body 5c having a head 5a formed with a recess 5b in its upper surface, an ornamental seal 2 inserted in the recess 5b, and a film layer 3 of a transparent or translucent material for protectively covering the upper surface of the ornamental seal 2.

The film layer 3 can be made from an adhesive material which is used to adhesively secure the ornamental seal 2 in the recess 5b.

The ornamental seal 2 may be secured in the recess 5b, by first applying adhesive on its lower and/or upper surface, and then inserting it in the recess 5b. In this case, a removable or strippable cover sheet may be placed on the surface(s) of the ornamental seal 2 to which adhesive has (have) been applied. Such a cover sheet is removed or stripped, before the ornamental seal 2 is inserted into the recess 5b of the ornamental bolt 5, so as to cause the adhesive surface(s) to be exposed. The ornamental seal 2 is then inserted into the recess 5b and adhesively secured therein.

Alternatively, the ornamental seal 2 is first inserted into the recess 5b. Then, a quantity of adhesive is filled in the recess 5b. By this, the ornamental seal 2 may be secured in the recess 5b. Furthermore, the film layer 3 of a transparent or translucent material covering the upper surface of the ornamental seal 2 may be formed by the adhesive filled in the recess 5b.

The bolt body 5c is formed in the following procedure. First, a length of material of a rod-like configuration is cut into a predetermined length. The material may be a metal which has been commonly used for conventional bolts, such as structural carbon steel. The material cut into a predetermined length is shaped, by forging, to form raw body having a head 5a of a hexagonal cross-section and a barrel or shank 5d. Alternatively, the raw body may be formed by casting the above-mentioned metal material. A threaded portion 5e is formed on the barrel 5d by means of machining using a turning machine, for example, or by means of rolling. The recess 5b is formed in the upper surface of the head 5a by means of machining or rolling. The thus obtained bolt body 5c is subjected to a plating treatment or preservation treatment. Thereafter, the ornamental seal 2 is inserted in the recess 5b and secured therein.

The ability to prevent the ornamental seal 2 and the film layer 3 from removal or separation depends on an adhesive strength of the adhesive used. It is noted, however, that such ability may be further increased using a physical anchoring force, in addition to the above-mentioned adhesive strength of the adhesive. Specifically, an anchoring groove 5f of an annular configuration may be formed in the inner peripheral surface of the recess 5b, as shown in FIG. 2B. Alternatively, the inner peripheral surface of the recess 5b may be formed into a reversed conical configuration 5g tapering toward the open end, as shown in FIG. 3B.

In accordance with the invention, the ornamental seal 2 may be formed from a metal sheet, a plastic sheet or a paperboard. For example, a plurality of planar printed ornamental patterns, a plurality of pressed stereoscopic ornamental patterns, characters, symbols, or a various kinds of irregularities or patterns may be provided at equidistant intervals on a tape-like or sheet-like substrate. The substrate may be cut into a length and placed in the recess 1b or 5b. One example of such ornamental pattern is shown in FIGS. 4A and 4B in which a pentagonal star-like configuration is formed in a protruded fashion. Contrariwise, such pattern may be formed in a recessed fashion. The substrate may be colored in red, blue, yellow or another appropriate color. Then, desired characters, symbols or patterns in color different from that of the substrate may printed on the substrate. Alternatively, another appropriate method may be employed. Fog example, the ornamental pattern may be formed by sticking a separate piece, such as gold foil, on the substrate.

The ornamental seal 2 has on the upper surface thereof the film layer 3 of a transparent or translucent material. Owing to the lens effect of the film layer 3, it is possible for the ornamental pattern of the ornamental seal 2 to be stereoscopically displayed in relief-like fashion. Accordingly, ornamental nuts 1 and ornamental bolts 5 of a solid and high-quality characteristic may be provided.

It is also noted that gold dust or particles of a light-reflective material may be added to the film layer 3. The substrate of the ornamental seal 2 or the ornamental pattern may be partially or entirely colored with fluorescent paint or luminous paint. In any case, the ornamental seal 2 may be formed in its entirety into a thin layer. Accordingly, the recess 1b of the nut body 1c into which the ornamental seal 2 is fitted may also be made shallow. Thus, the nut body 1c may be reduced in its dimension. In the case of the ornamental bolt, the head 5a may be reduced in its dimension.

The above embodiments have been explained in relation to the case in which they are used to attach wheels to an axle of an automobile. It is noted, however, that the above-mentioned embodiments may be applied to ornamental bolts or nuts to be used in marine vessels, aircraft, houses, furniture or another apparatus or equipment in all industries.

As will be appreciated from the foregoing, and according to the ornamental nut of the invention, the ornamental seal is secured in the recess of the nut body by means of the film layer which covers the ornamental seal. Accordingly, a plating or coating of the nut body may be prevented from damage. Since the ornamental seal is protectively covered by the film layer, occurrence of damages such as scratch or score may be semipermanently prevented. It is also noted that, since the ornamental seal is not protruded outwardly from the recess, breakage and/or removal or separation of the ornamental seal may be semipermanently prevented. It is noted further that, owing to the lens effect of the film layer, a printed planar ornamental pattern, a pressed stereoscopic ornamental pattern, characters, symbols or another various kinds of irregularity or patterns may be displayed in relief-like fashion. Thus, ornamental nuts of a solid and high-quality characteristic may be provided.

A process step of producing an ornamental seal is merely required. The thus produced ornamental seal is fitted into the recess of the nut body. A quantity of adhesive is filled in the recess. Alternatively, the ornamental seal is preliminarily applied with adhesive. The ornamental seal may be secured in the recess by curing the adhesive by means of heating, natural air drying or forced-air drying. Thus, the ornamental nuts or bolts may be manufactured in simple manner and at low-cost. Modification of the design may also be performed easily. The ornamental seal may be formed from a metal sheet, a plastic sheet or a cartonboard as a thin layer. Thus, the recess of the nut body into which the ornamental seal is fitted may also be made shallow, thus reducing the nut body in its dimension.

It is noted that advantages similar to those in the ornamental nuts may be obtained in the ornamental bolts according to the invention.

It will further be obvious to those skilled in the art that many variations may be made in the above embodiments, here chosen for the purpose of illustrating the present invention, and full result may be had to the doctrine of equivalents without departing from the scope of the present invention, as defined by the appended claims.

I claim:

1. An ornamental nut comprising: a nut body having a threaded hole and a recess defined by a circumferential wall positioned at the rear end of the threaded hole, an ornamental seal inserted in the recess and secured therein, and a film layer of a transparent or translucent material for protectively covering the upper surface of the ornamental seal, wherein the film layer is contained by the circumferential wall.

2. An ornamental bolt comprising: a bolt body including a head having a recess defined by a circumferential wall in its upper surface, an ornamental seal inserted in the recess and secured therein, and a film layer of a transparent or translucent material for protectively covering the upper surface of the ornamental seal, wherein the film layer is contained by the circumferential wall.

3. An ornamental nut comprising: a nut body having a threaded hole and a recess positioned at the rear end of the threaded hole, an ornamental seal inserted in the recess and secured therein, and a film layer of a transparent or translucent material for protectively covering the upper surface of the ornamental seal, wherein the ornamental seal is secured in the recess by an adhesive made of a material which is the same as the material of the film layer.

4. An ornamental nut comprising: a nut body having a threaded hole and a recess positioned at the rear end of the threaded hole, an ornamental seal inserted in the recess and secured therein, and a film layer of a transparent or translucent material for protectively covering the upper surface of the ornamental seal, wherein the ornamental seal is applied, on its lower surface, on its upper surface, or both, with adhesive, before the ornamental seal is inserted in the recess and secured therein.

5. An ornamental nut comprising: a nut body having a threaded hole and a recess positioned at the rear end of the threaded hole, an ornamental seal inserted in the recess and secured therein, and a film layer of a transparent or translucent material for protectively covering the upper surface of the ornamental seal, wherein the ornamental seal is first inserted in the recess, and then secured in the recess by filling a quantity of adhesive in the recess, and wherein the film layer of a transparent or translucent material for covering the upper surface of the ornamental seal is formed from a material which is the same as the adhesive filled in the recess.

6. An ornamental bolt comprising: a bolt body including a head having a recess in its upper surface, an ornamental seal inserted in the recess and secured therein, and a film layer of a transparent or translucent material for protectively covering the upper surface of the ornamental seal, wherein the ornamental seal is secured in the recess by an adhesive made of a material which is the same as the material of the film layer.

7. An ornamental bolt comprising: a bolt body including a head having a recess in its upper surface, an ornamental seal inserted in the recess and secured therein, and a film layer of a transparent or translucent material for protectively covering the upper surface of the ornamental seal, wherein the ornamental seal is applied, on its lower surface, on its upper surface, or both, with adhesive, before the ornamental seal is inserted in the recess and secured therein.

8. An ornamental bolt comprising: a bolt body including a head having a recess in its upper surface, an ornamental seal inserted in the recess and secured therein, and a film layer of a transparent or translucent material for protectively covering the upper surface of the ornamental seal, wherein the ornamental seal is first inserted in the recess, and then secured in the recess by filling a quantity of adhesive in the recess, and wherein the film layer of a transparent or translucent material for covering the upper surface of the ornamental seal is formed from a material which is the same as the adhesive filled in the recess.

* * * * *